L. TORRES Y QUEVEDO.
FUNICULAR RAILWAY SYSTEM AND CAR OR VEHICLE THEREFOR.
APPLICATION FILED MAY 16, 1910.

979,228.

Patented Dec. 20, 1910.

4 SHEETS—SHEET 1.

WITNESSES:
René Bruine
William F. Martinez

INVENTOR:
Leonardo Torres y Quevedo,
By Attorneys,

L. TORRES Y QUEVEDO.
FUNICULAR RAILWAY SYSTEM AND CAR OR VEHICLE THEREFOR.
APPLICATION FILED MAY 16, 1910.

979,228.

Patented Dec. 20, 1910.

4 SHEETS—SHEET 2.

WITNESSES:
René Bruine
William F. Martin

INVENTOR:
Leonardo Torres y Quevedo,
By Attorneys

L. TORRES Y QUEVEDO.
FUNICULAR RAILWAY SYSTEM AND CAR OR VEHICLE THEREFOR.
APPLICATION FILED MAY 16, 1910.

979,228.

Patented Dec. 20, 1910.

4 SHEETS—SHEET 3.

WITNESSES:
René Bruine
William F. Martinez

INVENTOR:
Leonardo Torres y Quevedo,
By Attorneys,
Fraser Hurk & Myles

UNITED STATES PATENT OFFICE.

LEONARDO TORRES Y QUEVEDO, OF MADRID, SPAIN.

FUNICULAR-RAILWAY SYSTEM AND CAR OR VEHICLE THEREFOR.

979,228.

Specification of Letters Patent. Patented Dec. 20, 1910.

Application filed May 16, 1910. Serial No. 561,750.

*To all whom it may concern:*

Be it known that I, LEONARDO TORRES Y QUEVEDO, a subject of the King of Spain, residing in Madrid, Spain, have invented certain new and useful Improvements in Funicular-Railway Systems and Cars or Vehicles Therefor, of which the following is a specification.

Funicular railways as hitherto constructed usually comprise carrying ropes and a special rope for hauling the vehicle. There are also installations wherein the carrying ropes, stretched between two points situated at the same altitude, bear the vehicle and on which the vehicle travels the larger part of its way is finished by the aid of an auxiliary force, for example by providing the vehicle with an electric motor supplied with current by the carrying rope serving the purpose of a trolley wire.

My invention relates to a system wherein one of the ropes becomes a traction or hauling rope when the vehicle stops after all the live force has been exhausted.

Figure 1:
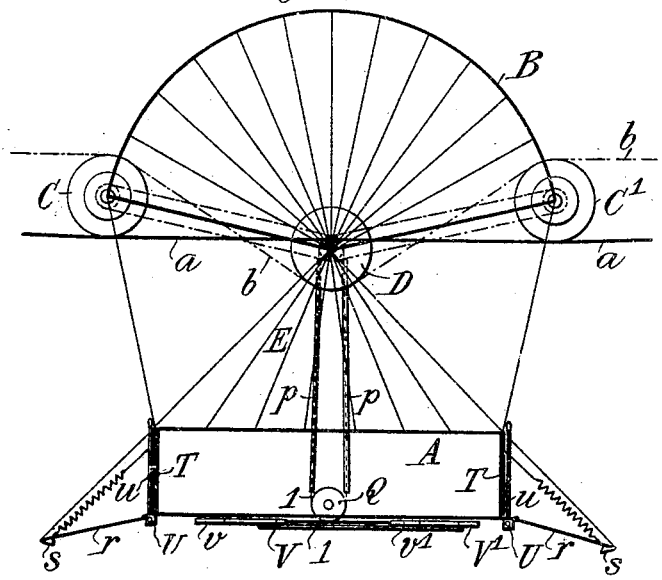
Figure 2:
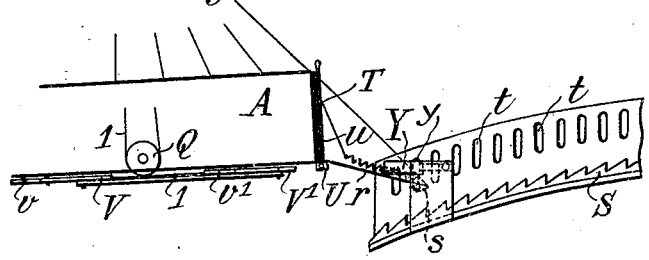
Figure 3:
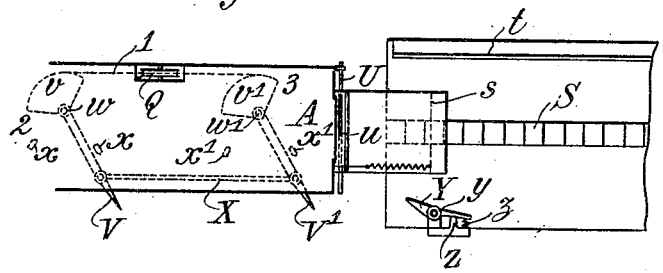
Figure 4:
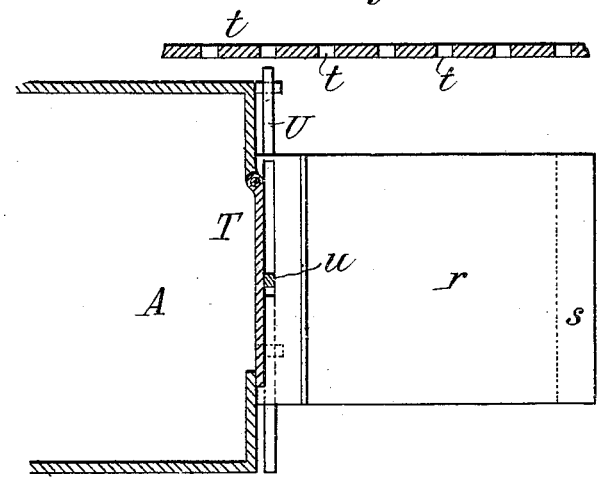
Figure 8:
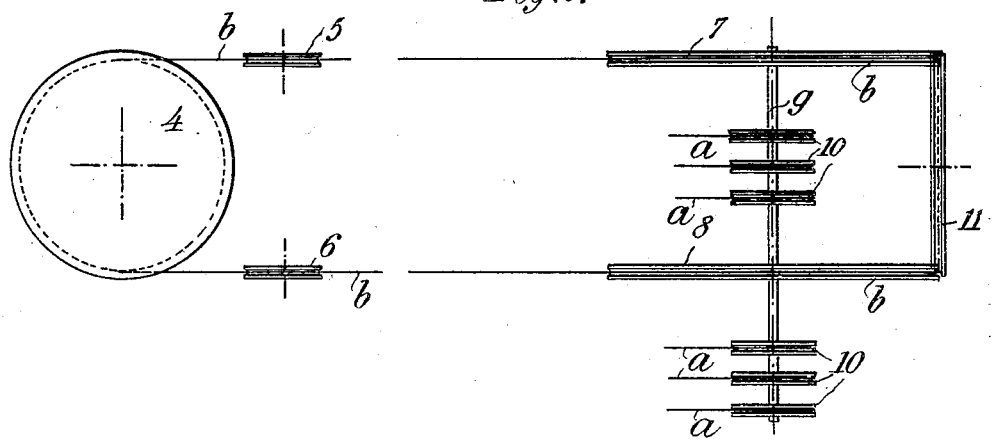
Figure 5:
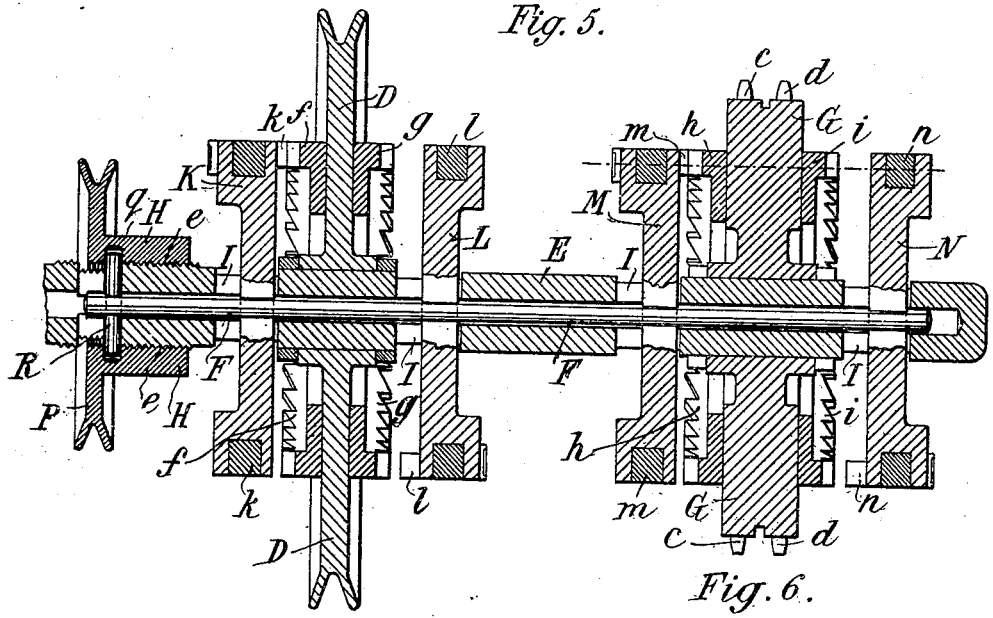
Figure 6:
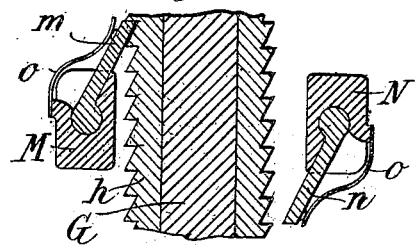
Figure 7:
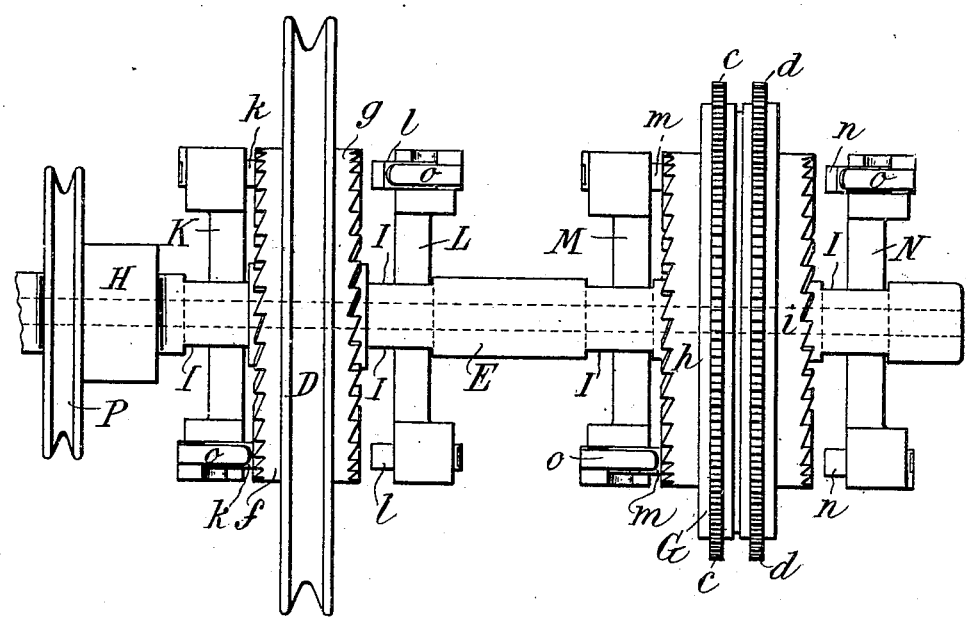

The invention will be fully understood by the following description with reference to the accompanying drawing, in which:

Figure 1 is an elevation of the entire vehicle. Fig. 2 is a view of a portion of the car and of the arrangement for securing it at the stations. Fig. 3 is a plan view of Fig. 2. Fig. 4 is a view, partly in plan and partly in section showing the arrangement for opening the door of the car. Figs. 5 and 6 are detailed sectional views of the clutch mechanism. Fig. 7 is an elevation of the clutch mechanism illustrated in Fig. 5. Fig. 8 is a plan of the general gear of the traction or haulage rope.

The track is formed by a suitable number of ropes $a$, for example six, fixed at one station and passing to the other station over pulleys, the tension of the said ropes being insured by suitable weights in the known manner. The tension to which these ropes are subjected is therefore constant and independent of the load which they have to support. The vehicle consists of a car A suspended by suitable cords to a carriage B provided with wheels. Suppose the carrying ropes $a$ to be six in number for example, they will be divided in such a manner that there will be three on each side of the carriage so that the latter will rest upon the carrying ropes by means of twelve wheels, six in front and six at the rear. A seventh rope $b$ passing over two bearing wheels C, $C^1$ placed in the median plane of the car supports the latter through the medium of another wheel D placed in the median plane; this wheel is mounted on the shaft E.

The principle of the system is therefore as follows: The carriage B and the car A being released at one of the stations, descends under the effect of its own weight, bearing upon the ropes $a$ and on the rope $b$. The vehicle passes beyond the lowest point owing to its inertia when, the live force being exhausted, the vehicle will have a tendency to return to said lowest point, and the wheel D of the median plane of the vehicle will be rendered immovable upon its fixed shaft, that is to say, it will no longer be able to turn; then the rope $b$ stretched between the wheels C, $C^1$ and the fixed wheel D at a very obtuse angle, exerts upon the wheel D a frictional force such that the sliding of the vehicle with relation to the rope $b$ is impossible and that, if at this moment a movement of translation be given to the rope $b$ in the direction of travel the said rope $b$ will draw along the vehicle with it.

I will now describe the mechanism which allows of automatically locking the wheel D on the shaft. The shaft E is fixed: it is hollow and is provided in the interior with a rod F. On the shaft E are mounted the pulley D generally loose and the piece G also loose, carrying two pinions $c$, $d$ each gearing with a chain. Each of these chains gears with a toothed ring similar to $c$ or to $d$, mounted upon one of the shafts of the carrying wheels, so that the rotation of the drum G positively causes the rotation of the two axles of the carriage B and of the twelve carrying wheels.

The shaft E is provided with a screw-threaded end $e$ on which is screwed a nut H; in the shaft E are made ten longitudinal grooves, such as I, arranged opposite one another in pairs; these grooves allow four arms K. L. M. N mounted on the rod F to pass, so that the said rod F can only slide along the shaft E without revolving. The drum G and the wheel D each carry two toothed rings $f$, $g$ and $h$, $i$ which can come into engagement with pawls $k$, $l$, $m$, $n$ mounted upon the arms K, L, M, N and held in engagement by springs $o$. On the nut H is mounted a grooved pulley P which is driven by means of an endless rope from a pulley Q fixed to the car; this endless rope passes within two thin tubes $p$ so that it shall not interfere with the passengers. Moreover, the nut H is provided with an inner circular groove $q$ in which engages a kind of pin R. It will be seen that upon causing the nut H to turn by actuating the pulley Q the said nut will in its longitudinal displacement carry along the rod F through the medium of the pin R and consequently cause the displacement of the arms K, L, M, N which thus effects the engagement of one of the sets of teeth carried by the wheel D or by the drum G with the pawls mounted on K M or upon L, N as the case may be.

When the rod F is completely pushed to the left hand, for example, the set of teeth $i$ of the drum G is in engagement with the pawl $n$ which prevents the movement of G in a certain direction corresponding to the backward movement of the vehicle. The set of teeth $g$ of the wheel D is then also in engagement with the pawl $l$, which similarly locks the wheel D to the shaft E and prevents it from turning in the direction in which the rope would act upon the wheel. If then the rope $b$ has a movement of translation communicated to it by the motor situated at the station, it will draw along the vehicle or car by reason of the friction, so there can be no relative displacement between the rope $b$ and the wheel D; but the drum G can continue to revolve in the direction in which the pawl $n$ does not stop it and the carrying wheels will continue to roll upon the ropes $a$. On arriving at the station there is an automatic action upon the pulley Q which will be hereinafter described and this pulley drives the pulley P the effect of which is to push the rod F toward the right hand; then, the wheel D is unlocked and the traction rope $b$, no longer acts; the carrying pulleys effect the braking, the vehicle stops and tends to redescend but it is then arrested by a grappling arrangement which will be hereinafter described.

It will be understood that the operations would be reversed if the vehicle moved in the opposite direction to that which has served as an example for explaining the working. In this working it is necessary to avoid: 1. The carriage being made fast to the rope $b$ while it is traveling at high speed. 2. The motor not being stopped in time by the engineer in charge of it at the station immediately the carriage arrives at the opposite station. 3. The carriage being released by accident while the passengers are getting in. The accessory arrangements provided for this purpose are as follows:—

1. The car A is provided with two landing bridges $r$; each of them is provided with a kind of tooth $s$ hooking into a rack S, and when once the tooth $s$ has been disengaged from the rack a spring prevents the bridge, by lifting it, from again becoming hooked by inadvertence.

2. On one side of the rack S is arranged a fence in which opposite each tooth of the rack is an incurved slot $t$ so that, the car being kept in the stopping position by reason of the engagement of the hook $s$ with one tooth of the rack S, it is necessary, in order to open the door T of the car, to disengage a bolt U which extends into the slot $t$ opposite to it. Owing to the incurved shape of the slot the car will be able to slightly oscillate. It will thus be seen that the car cannot start off again so long as the bolt U is not free of the slot $t$ which will necessitate the door T having been previously closed. $u$ is an operating rod carried by the bolt.

3. The operation of the pulley Q is automatic. Over this pulley passes a rope 1 making a complete turn, and the two ends of which are attached to the ends 2, 3 of two sectors $v$, $v^1$ oscillating upon axes $w$, $w^1$ and having extensions forming two levers V, $V^1$ capable of oscillating between fixed stops $x$, $x^1$, these two levers are connected together by a rod X. On the other hand, the floor of the rack S carries a finger Y oscillating upon a pivot pin $y$ which is normally pulled by a spring $z$ against a stop Z. When the car reaches the end of its course on the rack S the end of the lever $V^1$; for example if the vehicle is moving toward the right hand comes in contact with the finger Y which causes the automatic displacement of the levers V, $V^1$ from right to left and, consequently, the rotation of the pulley Q and the lateral displacement of the rod F as already described. The continuation of the movement toward the right hand is further rendered possible by the rocking action of the finger Y.

The rope $b$ designed to become the traction rope, at the required moment, passes to one of the stations over a pulley 4 with vertical axis, is guided on either side of the said pulley by two small pulleys 5, 6 and at the other station winds over two large pulleys 7, 8 mounted upon the same shaft 9 as the pulleys 10 over which pass the carrying ropes $a$ and finally passes under a third pulley 11 of large diameter placed at right angles to the pulleys 7 and 8.

The system of attachment of the rope $b$ to the vehicle can be effected in any suitable manner, either by the arrangement hereinbefore described or by any other system of nippers or grippers. Furthermore the pulling cable is operated with a uniform movement and the connection with the vehicle is effected when the velocity of the latter in its retarded movement, becomes equal to the velocity of the cable.

Claims:

1. In a funicular railway system, the combination of a series of supporting ropes one of which is moving, of a vehicle free to move forward under the forces of gravity and momentum, and means connecting said vehicle and said moving rope upon decrease of the speed of the vehicle.

2. In a funicular railway system, the combination of a series of supporting ropes one of which is moving, of a vehicle free to move forward under the forces of gravity and momentum, two wheels over which said moving rope passes and a third wheel under which it passes, said wheels being free to turn while the vehicle moves forward with greater speed than said moving rope, and means locking one of said wheels against movement upon equalization of the speed of the vehicle and moving rope, whereby said moving rope pulls upon said vehicle through said wheels.

3. In a funicular railway system, the combination of a series of supporting ropes one of which is moving, of a vehicle free to move forward under the forces of gravity and momentum, two wheels over which said moving rope passes and a third wheel under which it passes, said wheels being free to turn while the vehicle moves forward, and a pawl engaging said third wheel to lock the same against movement upon equalization of the speed of the vehicle and moving rope, whereby said moving rope pulls upon said vehicle through said wheels.

4. In a funicular railway system, the combination of a series of supporting ropes one of which is moving, of a vehicle free to move forward under the forces of gravity and momentum, two wheels over which said moving rope passes and a third wheel under which it passes, said wheels being free to turn while the vehicle moves forward with greater speed than said moving rope, and means locking one of said wheels against movement upon equalization of the speed of the vehicle and moving rope, whereby said moving rope pulls upon said vehicle through said wheels, and means reversing the direction in which said locking means operate on said wheels.

5. In a funicular railway system, the combination of a series of supporting cables, a vehicle free to move forward under the forces of gravity and momentum, means for advancing said vehicle, and means causing said advancing means to operate to advance said vehicle upon a decrease in the speed of said vehicle.

6. In a funicular railway system, the combination of a series of supporting cables, a vehicle free to move forward under the forces of gravity and momentum, means for advancing said vehicle, means causing said advancing means to operate to advance said vehicle upon a decrease in the speed of said vehicle, a station platform, and means on said platform automatically causing said advancing-means to cease to operate to advance said vehicle when the vehicle reaches said station.

7. In a funicular railway system, the combination of a series of supporting cables, a vehicle free to move forward under the forces of gravity and momentum, means for advancing said vehicle, means causing said advancing means to operate to advance said vehicle upon a decrease in the speed of said vehicle, means for stopping said vehicle, a station platform, and means on said platform automatically causing said advancing-means to cease to operate to advance the vehicle, and to cause said means for stopping the vehicle to act when the vehicle reaches the station.

8. In a funicular railway system, the combination of a series of supporting cables, a vehicle free to move forward under the forces of gravity and momentum, means for advancing said vehicle, means causing said advancing means to operate to advance said vehicle upon a decrease in the speed of said vehicle, means for stopping said vehicle, a station platform, and means on said platform automatically causing said advancing-means to cease to operate to advance the vehicle, and to cause said means for stopping the vehicle to act when the vehicle reaches the station, and reversing the means which cause said advancing-means to operate to advance the vehicle.

9. In a funicular railway system, the combination of a series of supporting cables, a vehicle free to move forward under the forces of gravity and momentum, means for advancing said vehicle, means causing said advancing means to operate to advance said vehicle upon a decrease in the speed of said vehicle, a station platform, and means on said platform automatically causing said advancing-means to cease to operate to advance said vehicle when the vehicle reaches said station, and means locking said vehicle to said platform.

10. In a funicular railway system, the combination of a series of supporting cables, a vehicle free to move forward under the forces of gravity and momentum, means for advancing said vehicle, means causing said advancing means to operate to advance said vehicle upon a decrease in the speed of said vehicle, means for stopping said vehicle, a station platform, and means on said platform automatically causing said advancing-means to cease to operate to advance the vehicle and to cause said means for stopping the vehicle to act when the vehicle reaches the station, and means locking said vehicle to said platform.

In witness whereof, I have hereunto signed my name in the presence of two subscribing witnesses.

LEONARDO TORRES Y QUEVEDO.

Witnesses:
DEAN B. MASON,
GABRIEL BELLIARE.